(12) United States Patent  
Suzuki (10) Patent No.: US 10,875,570 B2  
(45) Date of Patent: Dec. 29, 2020

(54) STEERING ASSISTANCE DEVICE AND STEERING ASSISTANCE METHOD

(71) Applicant: ISUZU MOTORS LIMITED, Tokyo (JP)

(72) Inventor: Terubiko Suzuki, Ayase (JP)

(73) Assignee: ISUZU MOTORS LIMITED, Tokyo (JP)

( * ) Notice: Subject to any disclaimer, the term of this patent is extended or adjusted under 35 U.S.C. 154(b) by 169 days.

(21) Appl. No.: 16/322,886

(22) PCT Filed: Aug. 2, 2017

(86) PCT No.: PCT/JP2017/027985  
§ 371 (c)(1),  
(2) Date: Feb. 1, 2019

(87) PCT Pub. No.: WO2018/025897  
PCT Pub. Date: Feb. 8, 2018

(65) Prior Publication Data  
US 2020/0180679 A1  Jun. 11, 2020

(30) Foreign Application Priority Data

Aug. 2, 2016  (JP) .................. 2016-152056

(51) Int. Cl.  
*B62D 5/04* (2006.01)  
*B62D 5/02* (2006.01)  
(Continued)

(52) U.S. Cl.  
CPC ......... *B62D 5/0463* (2013.01); *B62D 5/0409* (2013.01); *B62D 15/021* (2013.01);  
(Continued)

(58) Field of Classification Search  
CPC ...... B62D 15/021; B62D 15/025; B62D 5/04; B62D 5/0409; B62D 5/0463; B62D 5/07; B62D 6/00; B62D 6/008  
See application file for complete search history.

(56) References Cited

U.S. PATENT DOCUMENTS 6,763,906 B1 * 7/2004 Momiyama ............ B62D 7/144  
180/24.01  
9,156,464 B2 * 10/2015 Schuberth ............ B62D 15/025  
(Continued)

FOREIGN PATENT DOCUMENTS

CN  101028831 A  9/2007  
CN  104428190 A  3/2015  
(Continued)

OTHER PUBLICATIONS

Extended European Search Report for related European Application No. 17836999.7, dated Jul. 10, 2019; 8 pages.  
(Continued)

*Primary Examiner* — Tyler J Lee  
(74) *Attorney, Agent, or Firm* — Procopio, Cory, Hargreaves & Savitch LLP (57) ABSTRACT

A steering assistance device includes: a steering angle sensor for detecting a steering angle of a vehicle; a motor for performing steering assistance of the vehicle by applying torque to a steering shaft; and a control unit for increasing increases the amount of steering assistance by the motor in case where the detected steering angle is included in an angular range corresponding to a steering play segment in which steering will not alter the direction of wheels of the vehicle as compared with a case where the detected steering angle is not included in an angular range.

5 Claims, 4 Drawing Sheets (51) Int. Cl.
*B62D 15/02* (2006.01)
*B62D 6/00* (2006.01)
*B62D 5/07* (2006.01)

(52) U.S. Cl.
CPC .................. *B62D 5/07* (2013.01); *B62D 6/00* (2013.01); *B62D 6/008* (2013.01); *B62D 15/025* (2013.01)

(56) References Cited

U.S. PATENT DOCUMENTS

| | | | |
|---|---|---|---|
| 9,302,704 B2* | 4/2016 | Ezoe | B62D 6/007 |
| 2002/0005313 A1 | 1/2002 | Yamazaki | |
| 2007/0205040 A1 | 9/2007 | Miyasaka et al. | |
| 2007/0215405 A1* | 9/2007 | Tsutsumi | B62D 5/0478 180/402 |
| 2007/0250234 A1 | 10/2007 | Ito et al. | |
| 2009/0037054 A1 | 2/2009 | Igarashi et al. | |
| 2013/0197762 A1* | 8/2013 | Schuberth | B60W 10/20 701/42 |
| 2014/0032051 A1* | 1/2014 | Ezoe | B62D 6/001 701/42 |
| 2017/0029026 A1* | 2/2017 | Okuda | B60W 30/09 |

FOREIGN PATENT DOCUMENTS

| | | |
|---|---|---|
| EP | 0771714 A2 | 5/1997 |
| JP | 2002-316659 A | 10/2002 |
| JP | 2006-199149 A | 8/2006 |
| JP | 2007-276708 A | 10/2007 |
| JP | 2009-035036 A | 2/2009 |
| JP | 2009-051488 A | 3/2009 |
| JP | 2014-080061 A | 5/2014 |
| JP | 2015-013548 A | 1/2015 |
| WO | 201316247 A1 | 10/2013 |
| WO | 2018/025902 A1 | 2/2018 |

OTHER PUBLICATIONS

International Search Report and Written Opinion for related International Application No. PCT/JP2017/027985, dated Oct. 24, 2017; 8 pages; English translation of ISR provided.
Office Action for the related Chinese application No. 201780047837.3, dated Sep. 30, 2020. English translation provided; total 13 pages.

* cited by examiner

STEERING ASSISTANCE DEVICE AND STEERING ASSISTANCE METHOD

CROSS-REFERENCE TO RELATED APPLICATIONS

This application is a U.S. National Stage entry of PCT Application No: PCT/JP2017/027985 filed on Aug. 2, 2017, which claims priority to Japanese Patent Application No. 2016-152056, filed Aug. 2, 2016, the contents of which are incorporated herein by reference.

TECHNICAL FIELD

This disclosure relates to a steering assistance device and a steering assistance method.

BACKGROUND ART

In a vehicle, it is known that there is a steering play segment where a steering force does not change the direction of wheels even when a steering wheel is steered. Patent Literature 1 discloses a technology of adding torque to a steering shaft in a steering play segment to transmit the steering force to the wheel in the steering play segment.

CITATION LIST

Patent Literature

Patent Literature 1: JP-A-2006-199149

SUMMARY

Technical Problem

As described in Patent Literature 1, when the steering force is transmitted to the wheel in the steering play segment, the steering play segment disappears. In this case, the steering wheel is steered due to the vibration or the like of the vehicle, steering for correcting the steering becomes necessary, and thus, the driving becomes unstable. Meanwhile, if there is a steering play segment, when a driver does not grasp a range of the steering play segment, the vehicle cannot be steered accurately.

This disclosure has been made in consideration of the above points, and provides a steering assistance device and a steering assistance method that can allow a driver to grasp a steering play segment.

Solution to Problem

A steering assistance device according to a first aspect of this disclosure includes: a steering angle detection unit, which detects a steering angle of a vehicle; a steering assistance unit, which performs steering assistance of the vehicle by applying torque to a steering shaft; and a control unit, which increases the amount of steering assistance performed by the steering assistance unit as compared with a case where the steering angle is not included in the angular range, in case where the detected steering angle is included in an angular range corresponding to a steering play segment where the steering does not change the direction of wheels of the vehicle.

The control unit may perform steering assistance by the steering assistance unit in case where the detected steering angle is included in the angular range, and stops steering assistance by the steering assistance unit in case where the detected steering angle is not included in the angular range.

The control unit may increase the steering force by the steering assistance unit in case where the detected steering angle is included in the angular range, and reduces the steering force by the steering assistance unit in case where the detected steering angle is not included in the angular range.

The control unit may cause the steering assistance unit to perform steering assistance such that the vehicle travels at the center of a lane, and causes, when the detected steering angle is included in the angular range in case where the vehicle travels at the center of the lane, the steering assistance unit to increase the amount of steering assistance as compared with a case where the detected steering angle is not included in the angular range.

A steering assistance method according to a second aspect of this disclosure includes: a step of detecting a steering angle of a vehicle: and a step of performing steering assistance of the vehicle by applying, to a steering shaft, a torque larger than a case where the detected steering angle is not included in the angular range, in case where the detected steering angle is included in an angular range corresponding to a steering play segment where the steering does not change the direction of wheels of the vehicle.

Advantageous Effects of the Invention

According to this disclosure, there is an effect that a driver can grasp a steering play segment.

DESCRIPTION OF EMBODIMENTS

Outline of Embodiment

Figure 1:
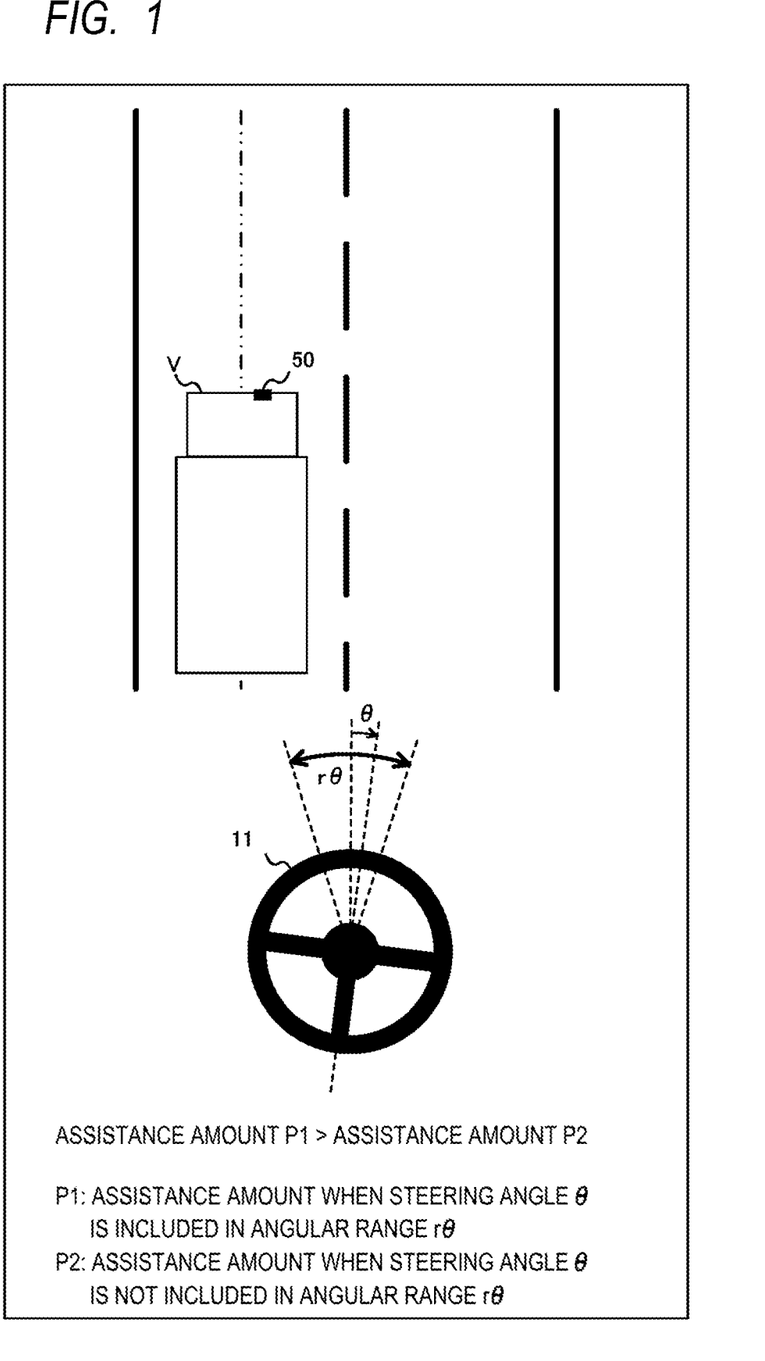
FIG. 1 is a view for describing an outline of a steering assistance device according to an embodiment.

FIG. 1 is a view for describing an outline of a steering assistance device according to an embodiment. The steering assistance device according to the embodiment is mounted on a vehicle V and is used for allowing a driver to grasp a steering play segment where steering does not change the direction of wheels of the vehicle V. Although not limited, the steering assistance device according to the embodiment is appropriately used for a large vehicle V such as a bus or a truck. In the following description, it is described on the assumption that the vehicle V is a large vehicle V such as a bus or a truck.

The steering assistance device according to the embodiment increases an assistance amount P1 that indicates the amount of the steering assistance when a steering angle θ of a steering wheel 11 provided in the vehicle V is included in an angular range rθ corresponding to the steering play segment to be larger than an assistance amount P2 when the steering angle θ is not included in the angular range rθ. Accordingly, the driver of the vehicle V can grasp whether or not the driver is steering within the steering play segment. Therefore, the driver can recognize the angular range of the steering wheel 11 that gives a change in a traveling direction of the vehicle V, thereby driving the vehicle V accurately.

<Structure of Steering Assistance System>

Figure 2:
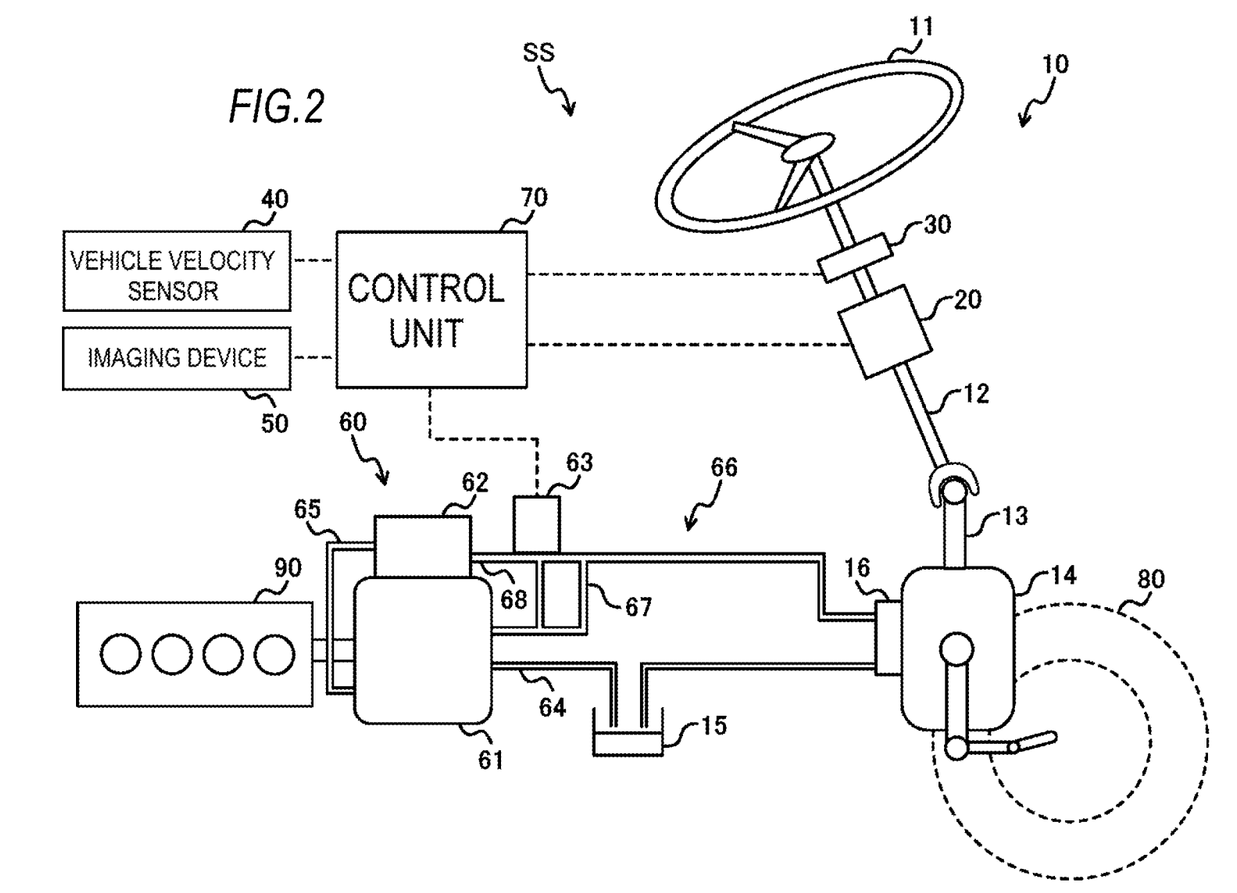
FIG. 2 is a view schematically illustrating a configuration of a steering assistance system according to the embodiment.

FIG. 2 is a view schematically illustrating a configuration of a steering assistance system SS according to the embodiment. As illustrated in FIG. 2, the steering assistance system SS includes an integral type steering unit 10, a motor 20, a steering angle sensor 30, a vehicle speed sensor 40, an imaging device 50, a pump unit 60, and a control unit 70.

The integral type steering unit 10 is a unit for assisting a steering operation by the driver. The integral type steering unit 10 includes a steering wheel 11, a steering shaft 12, a stub shaft 13, a power cylinder unit 14, a reservoir tank 15, and a control valve 16.

One end of the steering shaft 12 is connected to the steering wheel 11, and the other end thereof is connected to the stub shaft 13. One end of the stub shaft 13 is connected to the steering shaft 12, and the other end thereof is connected to an input shaft of the power cylinder unit 14. The steering shaft 12 and the stub shaft 13 transmit a steering torque applied to the steering wheel 11 to the power cylinder unit 14.

The power cylinder unit 14 transmits a driving force to a steering wheel 80 of the vehicle V.

The reservoir tank 15 stores the hydraulic oil to be supplied to the power cylinder unit 14.

The control valve 16 controls the oil amount of the hydraulic oil to be supplied to the power cylinder unit 14 and allows a hydraulic pressure corresponding to the steering torque to act on the inside of the power cylinder unit 14, thereby, assisting the steering operation of the driver.

The motor 20 is attached to the steering shaft 12. The motor 20 is rotationally driven by electric power supplied from the control unit 70, and accordingly, applies an assist torque (steering assist force) to the steering shaft 12 to assist the steering operation of the driver. The motor 20 mainly provides a steering guide function for the vehicle V to travel along a traveling lane.

The steering angle sensor 30 is provided in the steering shaft 12, detects a rotation amount of the steering shaft 12, and detects the steering angle θ based on the rotation amount. The steering angle sensor 30 outputs the detected steering angle θ to the control unit 70.

The vehicle speed sensor 40 detects the speed of vehicle V. The vehicle speed sensor 40 outputs the detected speed to the control unit 70.

The imaging device 50 is an in-vehicle camera mounted on the vehicle V. The imaging device 50 images a front part of the vehicle V in the traveling direction including the lane on which the vehicle V travels. The imaging device 50 outputs the captured image to the control unit 70.

The pump unit 60 includes a known variable displacement type pump. Under the control of the control unit 70, the pump unit 60 controls a flow rate of a driving oil supplied to the power cylinder unit 14 by the movement of the steering wheel 11, thereby providing a power assist function which further transmits a force in the same direction as the steering force transmitted to the power cylinder unit 14.

The pump unit 60 includes a pump housing 61, a control valve 62, and an electromagnetic valve 63.

In the pump housing 61, a pump chamber is defined and formed. The pump chamber is connected to the reservoir tank 15 via a suction passage 64, and suctions the hydraulic oil from the reservoir tank 15 via the suction passage 64. In addition, a first connecting passage 65 for supplying the hydraulic oil to the control valve 62 is connected to the pump chamber, and a second connecting passage 66 for supplying the hydraulic oil to the control valve 16 is also connected to the pump chamber.

The second connecting passage 66 is provided with a main oil passage 67 connected to the control valve 16 and an openable and closable auxiliary oil passage 68 connected to the control valve 62.

The control valve 62 controls the flow rate of the hydraulic oil supplied to the power cylinder unit 14 in cooperation with the electromagnetic valve 63.

The electromagnetic valve 63 controls opening and closing of the auxiliary oil passage 68. The electromagnetic valve 63 is controlled by being supplied with electric power based on the steering angle detected by the steering angle sensor 30 and a traveling speed of the vehicle V detected by the vehicle speed sensor 40 from the control unit 70.

The electromagnetic valve 63 closes the auxiliary oil passage 68 when energized. When the auxiliary oil passage 68 is closed, the control valve 62 reduces the pump discharge amount in the pump unit 60. Meanwhile, the electromagnetic valve 63 opens the auxiliary oil passage 68 in a non-energized state. When the auxiliary oil passage 68 is opened, the control valve 62 increases the pump discharge amount in the pump unit 60.

For example, since the steering assist force is required as the steering angle increases, an energizing amount to the electromagnetic valve 63 decreases as the steering angle increases. In addition, since the steering assist force is required as the speed of the vehicle V decreases, the energizing amount to the electromagnetic valve 63 decreases as the traveling speed of the vehicle V decreases.

The control unit 70 analyzes the image captured by the imaging device 50 and calculates a lateral shift amount of the vehicle V from the center position on the lane on which the vehicle V travels. For example, when the vehicle V is traveling at a predetermined speed or more, the control unit 70 controls the pump unit 60 and the motor 20 based on the calculated lateral shift amount to generate the steering assist force, and thus, the steering guide is performed such that the vehicle V travels at the center of the lane. Accordingly, the control unit 70 realizes a lane keeping support function.

In this manner, the steering assistance device 1 according to the embodiment functions as the power assist and lane keeping support of the vehicle V, and in the following description, a functional configuration of the steering assistance device 1 for realizing a steering play segment recognition support function which allows the driver of the vehicle V to grasp the steering play segment will be mainly described.

<Functional Configuration of Steering Assistance Device 1>

The steering assistance device 1 includes the control unit 70 and an assistance unit. The control unit 70 is a calculation resource including a processor such as a central processing unit (CPU) which is not illustrated, a memory, and the like.

The assistance unit is a mechanism that assists the driver of the vehicle V to move the steering wheel 80 by operating the steering wheel 11, and includes the motor 20 and the pump unit 60. The pump unit 60 functions as a first assistance unit that generates the steering assist force for assisting the steering of the vehicle V by the hydraulic pressure. In addition, the motor 20 functions as a second assistance unit that generates torque by the electric power, adds the torque to the steering shaft 12 as the steering assist force, and thus, performs the steering assistance of the vehicle V.

The control unit 70 realizes the steering play segment recognition support function when the vehicle V is traveling at the center of the lane, that is, when the steering assist force is not generated by the lane keeping support function for the vehicle V.

Specifically, when the steering angle is included in the angular range $r\theta$ corresponding to the steering play segment where the steering does not change the direction of the steering wheel 80, the control unit 70 increases the steering assistance amount by the motor 20 as compared with a case where the steering angle is not included in the angular range $r\theta$.

Here, the angular range $r\theta$ is a range where the steering angle is from $-\theta1$ to $+\theta1$ when a steering angle in a state where the steering wheel 11 is not operated is set to 0 degrees, a steering angle when the driver of the vehicle V turns the steering wheel 11 to the right is set to a positive value, and a steering angle when the driver turns the steering wheel 11 to the left is set to a negative value.

For example, when the detected steering angle is included in the angular range $r\theta$ corresponding to the steering play segment, the control unit 70 causes the motor 20 to generate the steering assist force in a direction in which the steering force by the driver increases. Further, when the detected steering angle is not included in the angular range $r\theta$ corresponding to the steering play segment, the control unit 70 stops the motor 20, thereby, stopping the steering assistance by the motor 20. In addition, when the detected steering angle is included in angular range $r\theta$, the control unit 70 may increase the steering force by causing the motor 20 to generate the steering assist force in the direction in which the steering force by the driver increases, and when the detected steering angle is not included in the angular range $r\theta$, the control unit 70 may reduce the steering force by causing the motor 20 to generate the steering assist force in the direction in which the steering force by the driver decreases.

Here, the control unit 70 causes the motor 20 to generate the steering assist force in the direction in which the steering force increases, even when the pump unit 60 can generate the required steering assist force alone. Specifically, the control unit 70 generates the steering assist force by reducing the steering assist force generated by the pump unit 60 by a predetermined amount, and causes the motor 20 to generate the steering assist force in the direction in which the steering force increases.

Figure 3A:
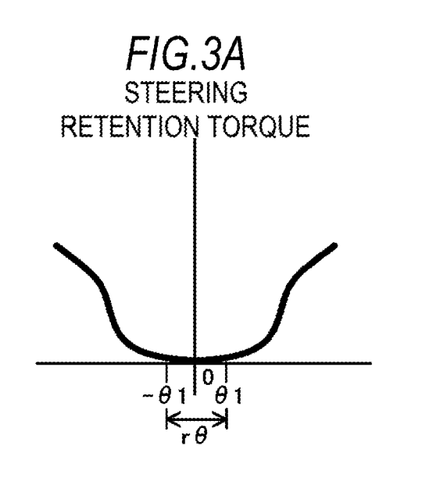
FIG. 3A to FIG. 3D are views for describing torque control of an assistance unit executed by a control unit according to the embodiment.
Figure 3B:
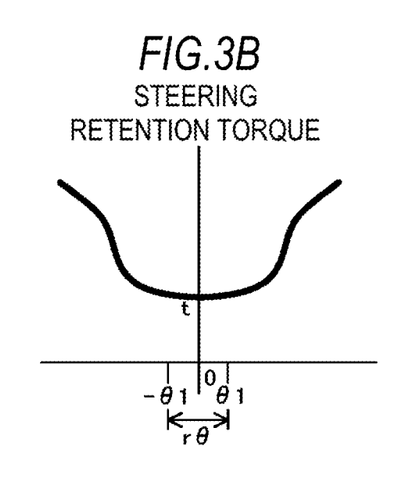
Figure 3C:
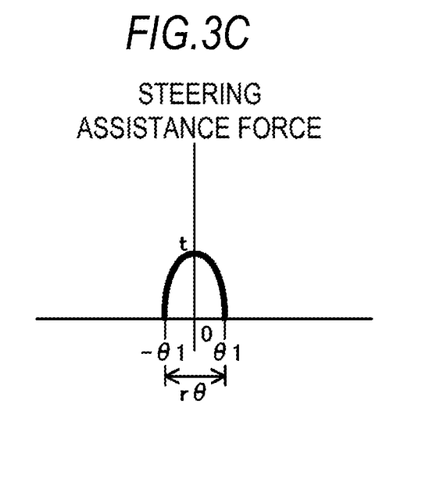
Figure 3D:
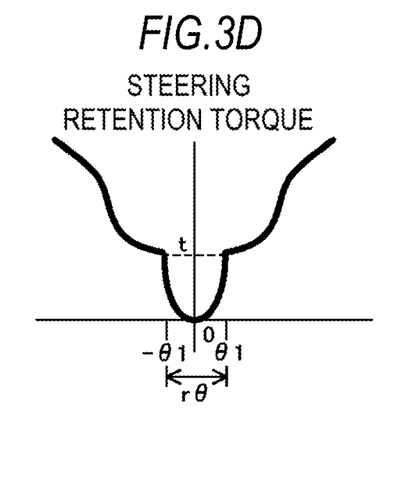

FIG. 3A to FIG. 3D are views for describing a steering assist control of the assistance unit executed by the control unit 70 according to the embodiment. FIGS. 3A, 3B, and 3D are views illustrating a relationship of the steering angle and the torque when the steering angle of the steering wheel 11 is set in the horizontal axis and a magnitude of the torque that serves as a drag force felt by the driver who operates the steering wheel 11 is set in the vertical axis. FIG. 3C is a view illustrating the relationship of the steering angle and the steering assist force when the steering angle of the steering wheel 11 is set in the horizontal axis and the steering assist force generated by the control unit 70 to the motor 20 is set in the vertical axis.

In FIG. 3, when the driver of the vehicle V turns the steering wheel 11 to the right, the steering angle becomes a positive value, and when the driver turns the steering wheel 11 to the left, the steering angle becomes a negative value. For the sake of convenience in the following description, there is a case where the magnitude of the torque that is the drag force felt by the driver who operates the steering wheel 11 is referred to as "steering retention torque".

FIG. 3A is a view illustrating a relationship of the steering angle and the steering assist force when the steering assist force is output only to the pump unit 60 in the vehicle V on which the steering assistance device 1 according to the embodiment is mounted. When the steering assist force is output only to the pump unit 60 as illustrated in FIG. 3A, that is, when only the power assist function is realized in the pump unit 60 and the steering assist force is not generated in the motor 20, the change in the steering retention torque is small in the vicinity of a boundary between the angular range $r\theta$ corresponding to the steering play segment and the outside of the segment. Therefore, it is difficult for the driver to grasp whether or not the steering is within the steering play segment.

Here, the control unit 70 controls the output of the motor 20 and the pump unit 60 such that the change in the steering retention torque increases depending on whether the detected steering angle is included in the angular range $r\theta$ corresponding to the steering play segment or the detected steering angle is not included in the angular range $r\theta$. Specifically, first, the control unit 70 lowers the output of the pump unit 60 as a whole only by a predetermined amount t. As a result, the relationship of the steering angle and the steering retention torque becomes as illustrated in FIG. 3B. Assuming that the steering wheel 11 is operated in a state where the steering retention torque characteristic is a shape expressed in FIG. 3B, the driver of the vehicle V feels that the steering wheel 11 as a whole is heavier only by the torque expressed by the predetermined amount t.

The control unit 70 outputs the steering assist force of which the maximum value is equal to or less than the predetermined amount t to the motor 20 at the same time when the output of the pump unit 60 is lowered only by the predetermined amount t.

FIG. 3C is a view illustrating a relationship of the steering assist force output to the motor 20 and the steering angle when the vehicle V on which the steering assistance device 1 according to the embodiment is mounted is traveling straight ahead at the center of the lane. As illustrated in FIG. 3C, when the steering angle is within the angular range $r\theta$ corresponding to the steering play segment, the control unit 70 causes the motor 20 to generate the steering assist force (assist torque) in the direction in which the steering force increases. The control unit 70 generates the steering assist force to the motor 20 such that the steering assist force decreases as the steering angle moves away from 0 degrees.

FIG. 3D is a view illustrating a relationship of the steering angle and the steering retention torque when the vehicle V on which the steering assistance device 1 according to the embodiment is mounted is traveling straight ahead at the center of the lane. As illustrated in FIG. 3D, as a result of transmitting the assist torque caused by the motor 20 to the steering shaft 12, the driver can operate the steering wheel 11 in a state where the steering retention torque is smaller than on the outside of the segment, in the angular range $r\theta$ corresponding to the steering play segment. Accordingly, the driver of the vehicle V can grasp whether or not the steering is within the steering play segment.

<Processing Flow of Steering Assistance Executed by Steering Assistance Device 1>

Figure 4:
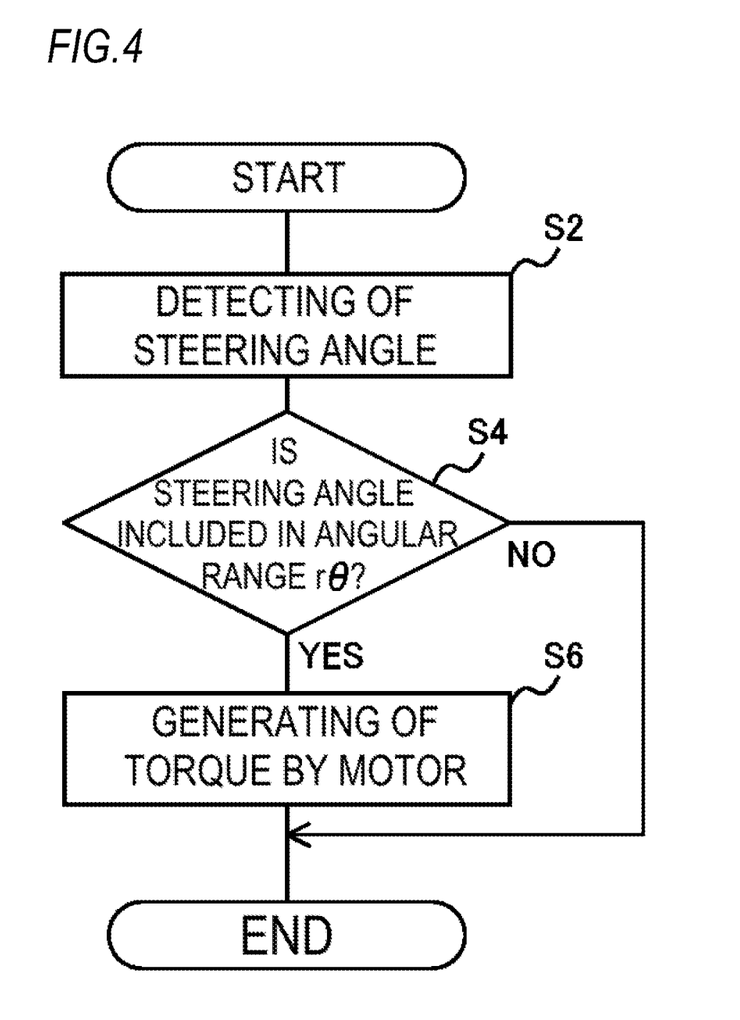
FIG. 4 is a flowchart for describing a flow of steering assistance processing related to a steering play segment recognition support function executed by the steering assistance device according to the embodiment.

FIG. 4 is a flowchart for describing a flow of steering assistance processing related to the steering play segment recognition support function executed by the steering assistance device 1 according to the embodiment. The processing in the flowchart starts, for example, when the vehicle V is traveling at the center of the lane.

The steering angle sensor 30 detects the steering angle of the steering wheel 11 (S2).

The control unit 70 determines whether or not the detected steering angle is included in the angular range rθ corresponding to the steering play segment (S4). When it is determined that the detected steering angle is included in the angular range rθ, the control unit 70 moves processing to S6, drives the motor 20, thereby, generating torque in the direction in which the steering force caused by the driver increases.

When it is determined that the detected steering angle is not included in the angular range rθ, the control unit 70 terminates the processing according to the flowchart. The steering assistance device 1 continues the control of the motor 20 related to the steering play segment recognition support function when the vehicle V is traveling at the center of the lane by repeating the above-described processing while the vehicle V is traveling.

As described above, the steering assistance device 1 according to the embodiment increases the amount of the steering assistance by the motor 20 when the detected steering angle is included in the angular range rθ corresponding to the steering play segment as compared with a case where the detected steering angle is not included in the angular range rθ corresponding. In this manner, in the steering assistance device 1 including the motor 20, the driver of the vehicle V can grasp the steering play segment.

In addition, the control unit 70 performs the steering assistance by the motor 20 when the detected steering angle is included in the angular range, and stops the steering assistance by the motor 20 when the detected steering angle is not included in the angular range. In this manner, the operation feeling of the steering wheel 11 on the outside of the steering play segment is set to be heavier than that of the operation of the steering wheel 11 within the steering play segment, and the feeling that steering the vehicle V can be given to the driver on the outside of the steering play segment.

In addition, when the detected steering angle is included in the angular range rθ when the vehicle V is traveling at the center of the lane, the control unit 70 increases the amount of the steering assistance by the motor 20 as compared with a case where the detected steering angle is not included in the angular range rθ. In this manner, it is possible to make it easy for the driver to grasp the steering play segment at the time of traveling at the center of the lane, and to perform the corrective steering at the time of traveling straight.

Above, although this disclosure has been described by the embodiment, the technical scope of this disclosure is not limited to the scope described in the above-described embodiment. It is apparent for a person skilled in the art that various changes or improvements can be added to the above-described embodiment. It will be apparent from the description of the scope of claims that an aspect with such changes or improvements can also be included in the technical scope of this disclosure.

For example, in the above-described embodiment, an example in which the steering assistance device 1 is used for a large vehicle V such as a bus or a truck has been described, but this disclosure is not limited thereto. For example, the steering assistance device 1 does not have a hydraulic cylinder and may be used for a vehicle such as a passenger car that realizes a power steering function by a motor.

The present invention contains subject matter related to Japanese Patent Application No. 2016-152056 filed in the Japanese Patent Office on Aug. 2, 2016, the entire contents of which are incorporated herein by reference.

INDUSTRIAL APPLICABILITY

According to this disclosure, a driver can grasp a steering play segment.

REFERENCE SIGNS LIST

1: steering assistance device
10: integral type steering unit
11: steering wheel
12: steering shaft
20: motor
30: steering angle sensor
40: vehicle speed sensor
50: imaging device
60: pump unit
70: control unit
SS: steering assistance system
V: vehicle

The invention claimed is:

1. A steering assistance device comprising:
a steering angle detection unit, which detects a steering angle of a vehicle;
a steering assistance unit, which performs steering assistance of the vehicle by applying torque to a steering shaft; and
a control unit, which increases the amount of steering assistance performed by the steering assistance unit as compared with a case where the steering angle is not included in the angular range, in case where the detected steering angle is included in an angular range corresponding to a steering play segment where the steering does not change the direction of wheels of the vehicle.

2. The steering assistance device according to claim 1, wherein
the control unit performs steering assistance by the steering assistance unit in case where the detected steering angle is included in the angular range, and stops steering assistance by the steering assistance unit in case where the detected steering angle is not included in the angular range.

3. The steering assistance device according to claim 1, wherein
the control unit increases the steering force by the steering assistance unit in case where the detected steering angle is included in the angular range, and reduces the steering force by the steering assistance unit in case where the detected steering angle is not included in the angular range.

4. The steering assistance device according to claim 1, wherein
the control unit causes the steering assistance unit to perform steering assistance such that the vehicle travels at the center of a lane, and causes, when the detected steering angle is included in the angular range in case where the vehicle travels at the center of the lane, the steering assistance unit to increase the amount of steering assistance as compared with a case where the detected steering angle is not included in the angular range.

5. A steering assistance method comprising:

detecting a steering angle of a vehicle; and performing steering assistance of the vehicle by applying, to a steering shaft, a torque larger than a case where the detected steering angle is not included in the angular range, in case where the detected steering angle is included in an angular range corresponding to a steering play segment where the steering does not change the direction of wheels of the vehicle.

* * * * *